United States Patent [19]

Straut et al.

[11] 4,307,916

[45] Dec. 29, 1981

[54] HYDRAULIC BRAKING SYSTEM

[75] Inventors: John E. Straut, Mahwah; William H. Kohler, Ringwood, both of N.J.

[73] Assignee: Tec Tran Corp., Mahwah, N.J.

[21] Appl. No.: 105,453

[22] Filed: Dec. 20, 1979

[51] Int. Cl.³ ............................................. B60T 13/22
[52] U.S. Cl. .................................. 303/6 M; 303/15; 303/22 R; 303/71
[58] Field of Search .................. 303/3, 6 R, 63, 6 A, 303/6 C, 6 M, 9, 10, 11, 13, 15, 22 A, 22 R, 23 A, 23 R, 119, 20, 71, 100, 113, 116, 16-17, 14; 188/195, 170

[56] References Cited

U.S. PATENT DOCUMENTS

Re. 29,096  1/1977  Jones .................................... 303/100
3,999,075  12/1976  Johnson et al. ................. 188/170 X

*Primary Examiner*—Douglas C. Butler

[57] ABSTRACT

Three embodiments of a hydraulic braking system are shown and described. Each embodiment provides a precisely controlled hydraulic braking system for a railway vehicle, which features a pilot pressure controlled brake control valve. The pilot pressure is selectively varied by operation of pressure control and flow control valves so that the power requirements for the hydraulic braking system are minimized. The braking system can be used with either spring-apply, pressure-release or pressure-apply, spring-release braking actuators. An auxiliary hydraulic system is provided to operate the brakes if the primary hydraulic system should fail. The pilot pressure fluid which operates the brake control valve can be either hydraulic or pneumatic. The brake control valve can be provided with a pneumatic emergency brake override control.

9 Claims, 3 Drawing Figures

4,307,916

HYDRAULIC BRAKING SYSTEM

BACKGROUND OF THE INVENTION

This invention relates generally to a hydraulic braking system and, more particularly, to such a system for a rail vehicle such as a rapid transit car.

Traditionally, railway vehicles have used air braking systems. These air braking systems have been developed to a point where they operate quite well for long haul freight and passenger train applications. However, the advent of rapid transit systems has developed the need for more precise braking of the rapid transit cars than can be achieved with air brakes.

In response to this need, hydraulic braking systems for railway vehicles have been developed. An example of one such hydraulic braking system is shown in U.S. Pat. No. Re 29,096. The braking system shown in that patent utilizes relatively incompressible hydraulic fluid rather than compressible air. Therefore, more precise braking control can be gained through the use of hydraulic fluid, as explained in that patent. The braking system shown in that patent has proved to be very effective in meeting the demanding operational requirements of the Washington Metro Transit System.

Braking pressure in the hydraulic braking system of U.S. Pat. No. Re 29,096 is regulated by a pilot pressure controlled brake control valve. Pilot pressure is varied by variably restricting the outflow of a constantly flowing pilot fluid. Although the system works quite well, the power required to maintain the constant flow of pilot fluid is excessive.

It is therefore an object of this invention to provide a hydraulic braking system for a rapid transit vehicle which minimizes power demands and which can be used with hydraulic or pneumatic controls and with a variety of brake actuators.

SUMMARY OF THE INVENTION

In its preferred form, this invention provides a hydraulically controlled, hydraulically actuated friction braking system for a transit vehicle which utilizes spring-apply, pressure-release disc brakes. A motor driven, constantly running, hydraulic pump supplies hydraulic fluid to an accumulator which stores the pressurized fluid for use in braking applications. When the accumulator is full, a valve unloads the pump to reduce power consumption. Hydraulic fluid is directed from the accumulator to disc brake calipers through a brake control valve. Hydraulic braking pressure is controlled by the operation of a brake control valve by a pilot pressure operator which opposes a biasing spring. Pilot pressure is provided from the accumulator through a fixed orifice and a pair of pilot pressure control valves in a pilot pressure line. These valves co-operate to vary the pilot pressure and operate the brake control valve to provide selectively variable hydraulic pressures to the calipers to effect predetermined braking rates. The pilot control valves are operated by a brake pressure selector, which also utilizes a pressure transducer to monitor the pilot pressure. The pilot pressure control valves accurately vary the pilot pressure to operate the brake control valve to produce an accurate braking rate by metering minute quantities of fluid to and from the pilot pressure line, thus requiring much less power than the system shown in U.S. Pat. No. Re 29,069.

An auxiliary operating circuit for the calipers is also included so that brake release can be attained, should the primary system fail. In another embodiment, the brake control valve is provided with a pneumatic override so that load-weighed emergency brake application can be achieved. In a further embodiment, the brake control valve is positioned by a pneumatic pilot control pressure.

These and further features of this invention will become apparent by reference to the following detailed description of the attached drawings, wherein.

DETAILED DESCRIPTION OF THE PREFERRED EMBODIMENT

Figure 1:
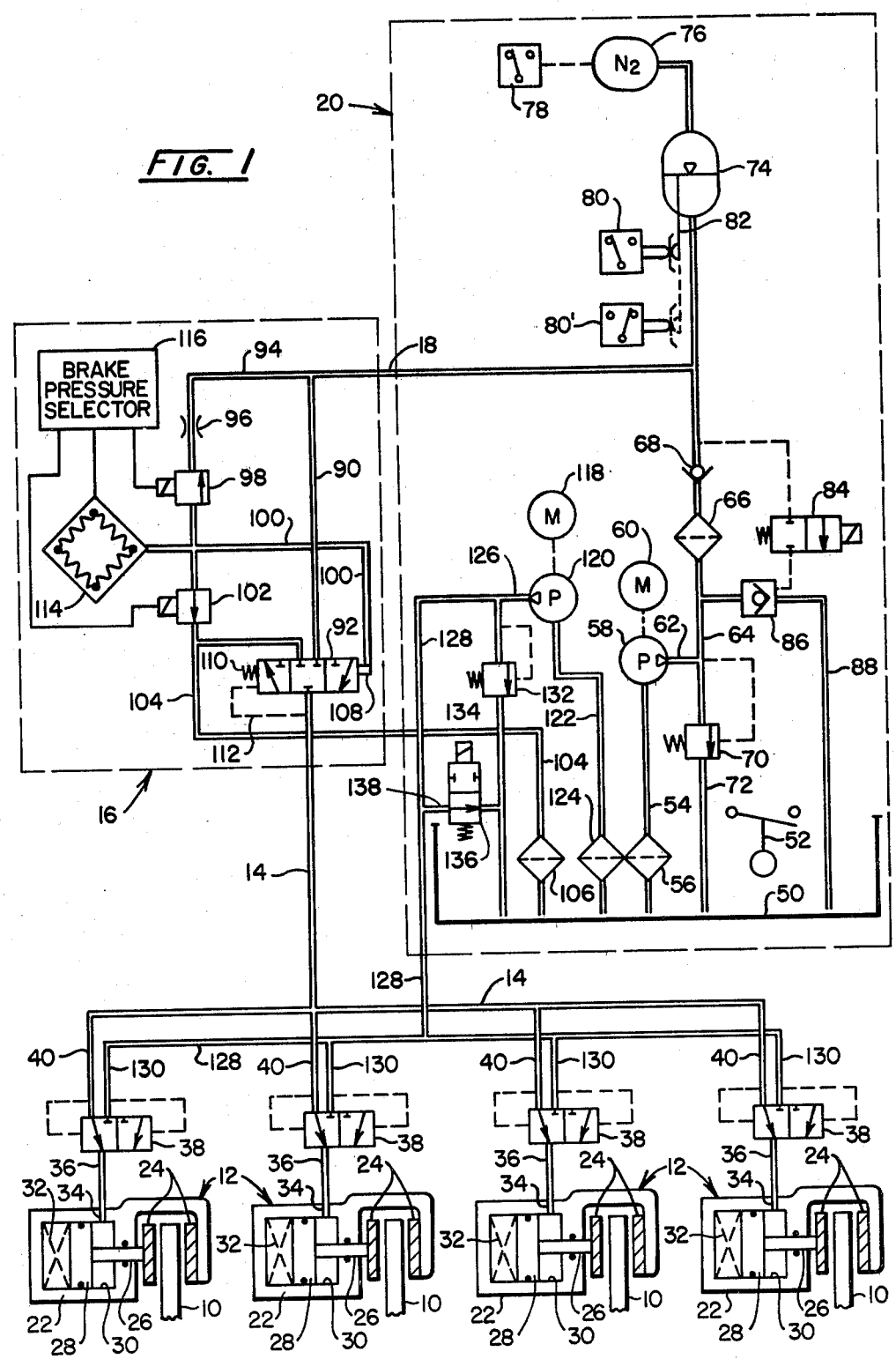
FIG. 1 is a schematic diagram of a preferred embodiment of a hydraulic braking system according to this invention.

Referring now to FIG. 1, a rapid transit or other railway vehicle (not shown) has a plurality of braking discs 10 mounted conventionally on its axles (not shown). A brake caliper 12 is mounted adjacent each disc 10 for co-operation therewith. These calipers are spring-apply, pressure-release actuators which are supplied with high pressure hydraulic fluid through a main brake line 14. The pressure in brake line 14 is controlled by a brake control means 16, which is supplied with hydraulic fluid by a supply line 18 from a hydraulic pressure fluid source 20.

Each of the calipers 12 includes a housing 22 which mounts a pair of friction pads 24, one of which is mounted on a rod 26 of a piston 28 which reciprocates within a brake cylinder 30. A spring 32 normally biases the pads 24 into engagement with the disc to provide braking. Release of the brake is attained by supplying high pressure hydraulic fluid to cylinders 30 through inlets 34. This provides fail-safety braking in that any loss of pressure in the hydraulic system will cause springs 32 to automatically apply the brakes.

The caliper inlets 34 are supplied with hydraulic fluid via lines 36, shuttle valves 38 and branch lines 40, which are connected to the main brake line 14. By varying the hydraulic pressure in cylinders 30 in opposition to the force of springs 32, a variable braking force can be exerted by pads 24 on discs 10 to provide varying braking rates for the vehicle.

The pressure in the main brake line 14 is controlled by brake control means 16, which will be described later. High pressure hydraulic fluid is supplied to brake control means 16 through supply line 18 by the hydraulic pressure fluid source 20, which includes a reservoir 50 having a float switch 52 which monitors the fluid level. Fluid is initially drawn from reservoir 50 through a suction line 54 and a strainer 56 to a hydraulic pump 58, which is driven by a continuously running 208 volt, A.C. motor 60. Pressurized fluid from pump 58 flows through an outlet 62 to a high pressure line 64 which includes a high pressure filter 66 and a check valve 68. Pressure in high pressure line 64 is limited by a relief valve 70 which connects to reservoir 50 by a return line 72.

High pressure line 64 connects to a hydraulic accumulator 74 that is pressurized by a nitrogen tank 76, the pressure of which is monitored by pressure switch 78.

The volume of fluid in accumulator 74 is monitored by a pair of oil level switches 80, 80' which are actuated by an indicator arm assembly 82, identical to that shown in U.S. Pat. No. Re 29,069. Switch 80 maintains a volume of fluid in accumulator 74 within predetermined limits. A full accumulator moves arm assembly 82 out of contact with switch 80, which halts the supply of fluid from pump 58 through line 64 to accumulator 74 by actuating an unloading solenoid 84 that opens a pilot operated check valve 86 to dump fluid in line 64 through a return line 88 to reservoir 50. This diminishes power requirements by permitting pump 58 to continue to run with no load until a low accumulator fluid level causes arm assembly 82 to contact switch 80. This causes solenoid 84 to close, whereupon pump 58 will again supply high pressure fluid to accumulator 74. An abnormally low fluid level in accumulator 74, caused by a leak or pump failure, is detected when arm assembly 82 contacts switch 80'. This condition actuates an auxiliary fluid supply, as will be later described. Thus, a predetermined quantity of high pressure hydraulic fluid is maintained in accumulator 74 for use in operating the brake control means 16, which will now be described.

High pressure fluid is supplied from accumulator 74 via lines 64 and 18 and a line 90 to a brake control valve 92. Brake control valve 92 is pilot controlled to meter fluid to or from main brake line 14 to vary the pressure in calipers 12. Pilot fluid is supplied from line 18 through a pilot supply line 94 and a fixed orifice 96 to a first electrically controlled pilot control valve or flow controller 98. Opening of valve 98 causes pilot pressure fluid to be supplied to a pilot pressure line 100. Pressure is regulated in pilot pressure line 100 by operation of a second electrically controlled pilot control valve or pressure controller 102 which can be opened to connect line 100 to the reservoir 50 via return line 104 through a return filter 106.

Pilot pressure line 100 is connected to a pilot pressure means 108 which acts on one end of brake control valve 92 to bias the valve toward a position supplying high pressure hydraulic fluid to main brake line 14 to reduce braking force. A biasing spring 110 acts on the other end of valve 92 in opposition to pilot pressure means 108 to bias the valve toward a position draining fluid from line 14 to the reservoir 50 through return line 104 to increase braking force. Precise positioning of brake control valve 92 is achieved through the co-operation of the pilot pressure means 108, spring 110 and the brake pressure in line 14, which is applied through a brake pressure feedback line 112 to the spring-end of valve 92 in opposition to the pilot pressure means 108.

The accurate positioning of brake control valve 92 to produce a predetermined brake pressure is dependent upon the pressure in the pilot pressure line 100. This pressure is monitored by a pressure transducer 114 which supplies a signal to a brake pressure selector 116. Selector 116 controls the operation of flow controller 98 and pressure controller 102 to maintain a preselected pressure in pilot pressure line 100.

SUMMARY OF OPERATION

In operation, hydraulic fluid from reservoir 50 is pressurized by pump 58 which supplies pressurized hydraulic fluid via line 64 to accumulator 74. Fluid from accumulator 74 is supplied through supply line 18 to brake control valve 92 which is operated to meter fluid to or from calipers 12 to decrease or increase the braking force on discs 10.

When a reduction in braking force is desired, flow control valve 98 is opened to increase pilot pressure in line 100. When the desired pressure is attained, it is sensed by transducer 114 and valve 98 will be closed by brake pressure selector 116. The increased pressure in line 100 will increase the force exerted by pilot pressure means 108 on brake control valve 92 and move it to a position connecting lines 90 and 14 to increase fluid pressure in calipers 12 and decrease the braking force. The increased pressure in line 14 is transmitted by feedback line 112 to the spring-end of valve 92, creating a force countering the force exerted by pilot pressure means 108 until the brake control valve is in equilibrium. This will occur when the desired pressure in line 14 and calipers 12 is reached.

Similarly, when an increase in braking force is required, pressure control valve 102 is opened to decrease the pilot pressure and, thus, the force exerted by pilot pressure means 108 on brake control valve 92. The force exerted via feedback line 112 will shift valve 92 to a position connecting line 14 to return line 104 until the valve is again in equilibrium and the desired lower pressure is reached in calipers 12. The lower pressure will enable springs 32 to increase the braking force.

This arrangement achieves accurate operation of brake control valve 92 to produce a predetermined braking pressure in calipers 12 and a resultant predetermined braking force on discs 10. By metering minute quantities of high pressure hydraulic fluid to and from line 100, very precise braking control is attained with a use of a minimum quantity of hydraulic fluid. This greatly reduces fluid consumption and limits the power required to operate the braking system.

In the event of a failure of the primary brake control system, which would prevent release of the brakes, an auxiliary brake release system is provided. A 36 volt, D.C. motor 118 drives an auxiliary hydraulic pump 120 to draw fluid from reservoir 50 through a line 122 which includes a strainer 124. Pressurized fluid is supplied from pump outlet 126 to an auxiliary supply line 128 and auxiliary branch lines 130 to shuttle valves 38. Shuttle valves 38 respond to pressurization of either primary branch lines 40 or auxiliary branch lines 130. Pressurization of auxiliary branch lines 130 causes shuttle valves 38 to shift and supply fluid to calipers 12 through lines 36 to release the brakes.

A relief valve 132 is provided in a return line 134 to limit the auxiliary hydraulic system pressure. A solenoid-operated valve 136 is located in a branch line 138 connecting auxiliary supply line 128 to return line 134. Valve 136 is spring biased open to drain supply line 128 and assure that shuttle valves 38 are positioned by pressure in the primary hydraulic branch lines 40 to connect lines 40 to lines 36 so that the primary hydraulic system will function.

Should the primary hydraulic system fail, the fluid level in accumulator 74 will reach a low level sufficient to cause indicator arm assembly 82 to actuate switch 80'. Thereafter, when the brake pressure selector 116 receives a command to reduce braking force by increasing pressure in calipers 12, it will simultaneously close solenoid-operated valve 136 and actuate motor 118. This will cause auxiliary pump 120 to pressurize auxiliary supply line 128, which will shift shuttle valves 38 to a position connecting auxiliary branch lines 130 with lines 36 and pressurize calipers 12 to release the brakes. When braking is again required, brake pressure selector 116 will simultaneously de-actuate motor 118 to stop pump 120 and open valve 136 to relieve pressure in line 128 and, thus, in calipers 12. This will enable springs 32 to exert a braking force to discs 10.

DESCRIPTION OF FIG. 2 MODIFICATION

Figure 2:
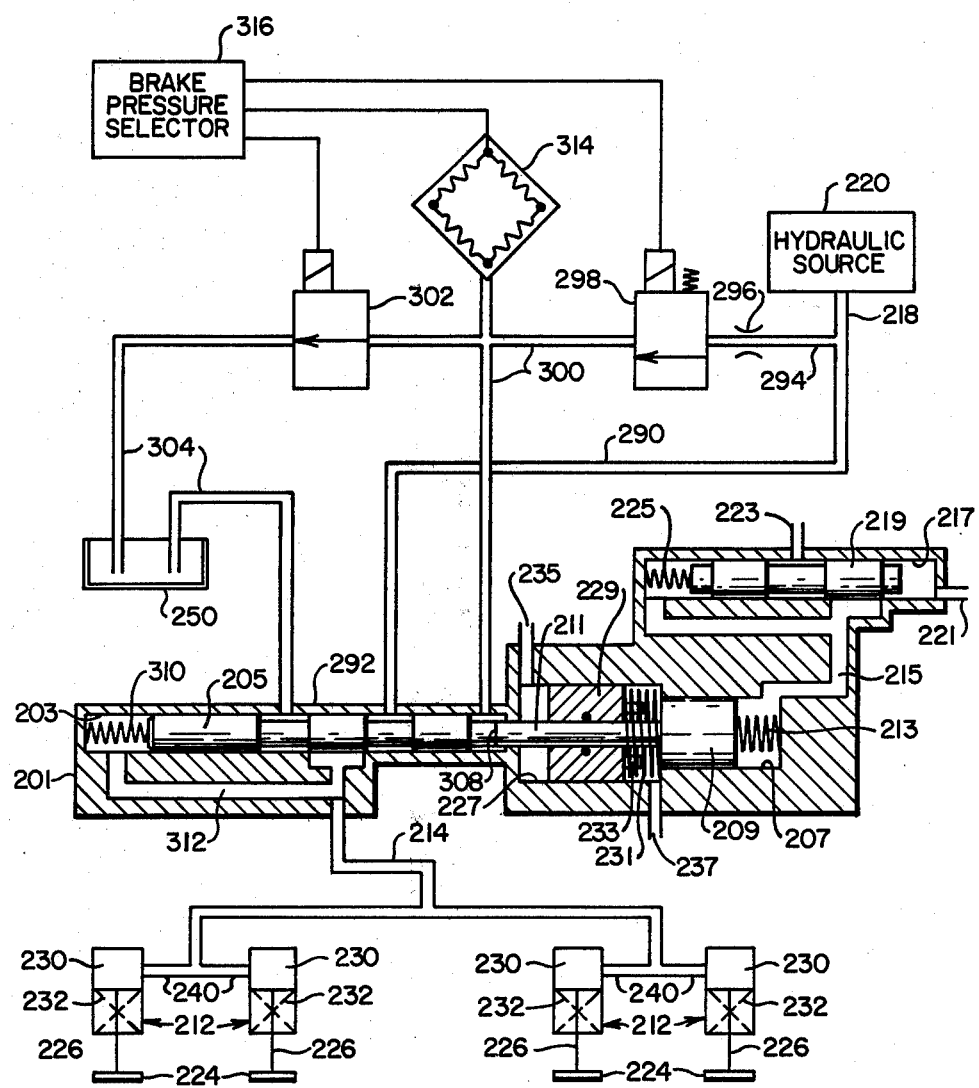
FIG. 2 is a schematic diagram of a modification of this invention, showing a pneumatic emergency override feature for the brake control valve.

FIG. 2 shows a modification of the hydraulic braking system shown in FIG. 1. Elements having the same function as elements in the FIG. 1 embodiment are denoted by adding 200 to the FIG. 1 reference numerals. One slight modification to the FIG. 2 embodiment is that the calipers 212 are pressure-apply, spring-release actuators. This is done to demonstrate that the hydraulic braking system of this invention can be used with either spring-apply, pressure-release or pressure-apply, spring-release calipers. For the sake of simplicity in this embodiment, no auxiliary hydraulic system is shown, although one could be used.

The major modification in this embodiment is the addition of a pneumatic emergency brake override control for operating the brake control valve 292. Valve 292 includes a housing 201 which has a valve bore 203 that slidably receives a three-landed spool 205. As in the FIG. 1 embodiment, spool 205 is biased to the right by a spring 310 and is biased leftwardly by pilot pressure means 308 which is supplied with pilot control fluid by line 300.

At its right end, housing 201 includes a second, larger bore 207 which slidably receives a piston 209 having a stem 211. A spring 213 biases piston 209 leftwardly to engage stem 211 with the right end of spool 205. Bore 207 is connected by a passage 215 with a bore 217 which slidably receives a spool 219. The right end of bore 217 has a port 221 that is connected to a source of variable pneumatic pressure (not shown), such as a conventional railway vehicle load-weigh air source, which will provide a pneumatic pressure varying directly with the load of the vehicle. The center of bore 217 has a port 223 connected to atmosphere. A spring 225 biases spool 219 rightwardly in opposition to the load-weigh air pressure acting on the right end of spool 219. Thus, spool 219 is operable to supply a variable air pressure via passage 215 to bore 207 to further bias piston 209 leftwardly.

Located intermediate spool 205 and piston 209 is a bore 227 which contains a blocking piston 229 that is freely slidable over stem 211. A spring 231 biases blocking piston 229 to the left. The right end of piston 229 mounts pins 233 which are operable to engage piston 209. The left end of bore 227 has a port 235 which connects to the vehicle's conventional emergency brake pipe (not shown). The right end of bore 227 has a port 237 which connects to atmosphere. The spring 231 is so chosen that the air pressure acting on the left end of piston 229 is normally operable to overcome the spring force and engage pins 233 with piston 209 to prevent leftward movement of piston 209 by spring 213 and the air pressure in bore 207.

In operation, load-weigh air pressure acting on the right end of spool 219 overcomes spring 225 to deliver a proportionally lower air pressure via passage 215 to bore 207 to assist spring 213 in biasing piston 209 leftwardly. The pressure in bore 207 is proportional to the load-weigh air pressure which, as noted above, varies directly with the weight of the vehicle. Leftward movement of piston 209 tends to open or further shift spool 205 leftwardly and increase braking pressure in main brake line 214.

Emergency brake pipe air pressure acting on the left end of blocking piston 229 normally overcomes spring 231 and engages pins 233 with piston 209 to block movement of piston 209. As is conventional in railway vehicles, an emergency brake application is achieved by dumping pressure in the emergency brake pipe, which reduces the pressure acting on the left end of blocking piston 229 to a low value. Spring 231 then moves blocking piston 229 out of engagement with piston 209. Via stem 211, piston 209 is then free to exert a leftward biasing force on spool 205 under the influence of spring 213 and the air pressure in bore 207. This causes a further leftward movement of spool 205 to a position creating a higher hydraulic pressure in calipers 212 to stop the vehicle at a higher, emergency braking rate. This emergency braking rate will vary with the weight of the vehicle because of variable force acting on piston 209 caused by the variable load-weigh air pressure.

In one application, a typical load-weigh air pressure would vary from 47 to 79 psi. Spring 225 is so chosen to produce a proportional air pressure in bore 207 of from zero to 32 psi. The rates of springs 213 and 231 are chosen to cause blocking piston 229 to block movement of piston 209 with an emergency brake pipe pressure of 150 psi.

DESCRIPTION OF FIG. 3 MODIFICATION

Figure 3:
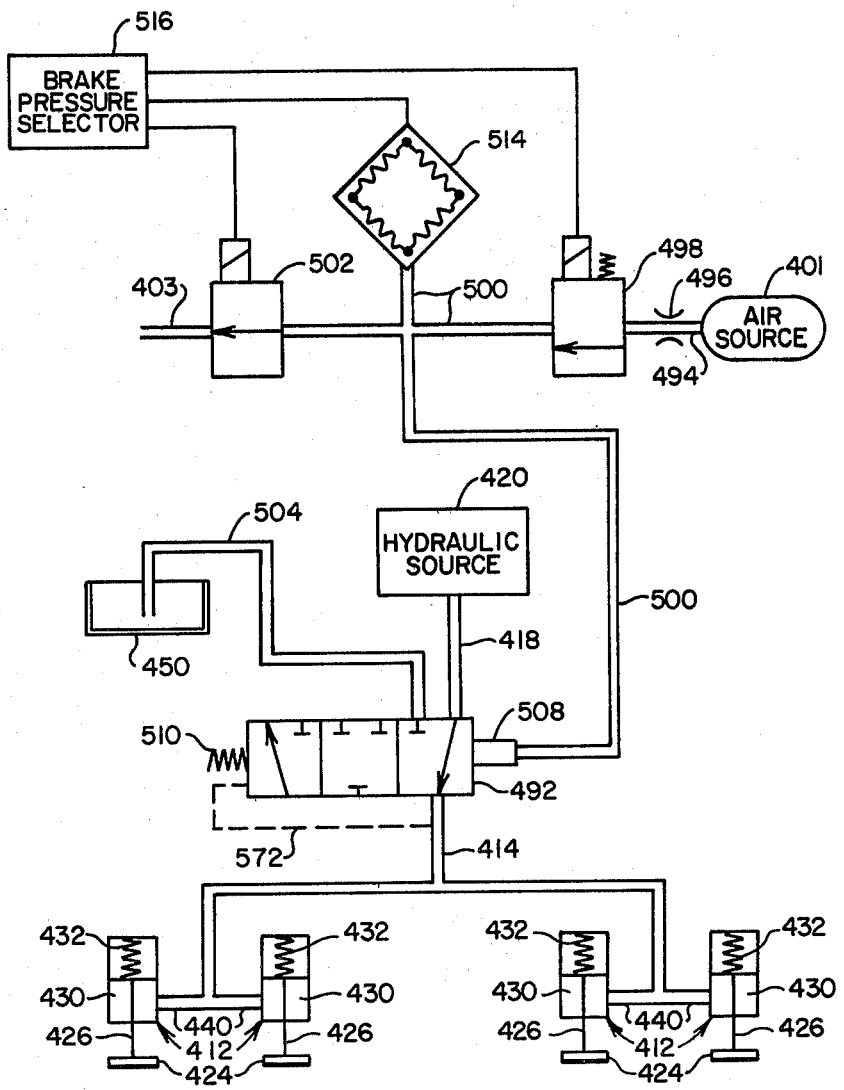
FIG. 3 is a schematic diagram of another modification of this invention, showing a pneumatic control for the brake control valve.

FIG. 3 illustrates a further modification of the hydraulic braking system shown in FIG. 1. Elements having the same function as elements in the FIG. 1 embodiment are denoted by adding 400 to the reference numerals. Again, for the sake of simplicity, no auxiliary hydraulic system is shown. As in FIG. 1, calipers 412 are spring-apply and pressure-release actuators.

As in the FIG. 1 embodiment, pressurized hydraulic fluid from hydraulic source 420 is delivered via line 418 to brake control valve 492 which is operable to meter fluid to and from main brake line 414 to vary the hydraulic pressure in cylinders 430 to vary the braking force. Spring 510 and hydraulic pressure in feedback line 572 bias brake control valve 492 toward a position connecting brake line 414 to return line 504 to increase braking force. Pilot fluid operator 508 acts on the opposite end of valve 492 to bias it toward a position supplying pressure fluid to the cylinders 430 to reduce braking force.

Pilot pressure means 508 is supplied with pressurized fluid through a line 500, the pressure of which is regulated by operation of flow control valve 498 and pressure control valve 502 by the brake pressure selector 516. However, instead of utilizing hydraulic fluid for this pilot pressure control function, a source of pneumatic pressure 401 supplies pressurized air through line 494 and orifice 496 to flow control valve 498. Pressure control valve 502 connects to a line 403 connected to atmosphere. Thus, the only difference between this embodiment and the FIG. 1 embodiment is the source of pilot pressure fluid which, in this case, is air rather than hydraulic. Otherwise, the operation is the same as in FIG. 1.

Three embodiments of a hydraulic braking system according to this invention have been shown and described. Each of these embodiments provides a precisely controlled hydraulic braking system for a railway vehicle, which features a pilot pressure controlled brake control valve; the pilot pressure is selectively varied by operation of pressure control and flow control valves so that the power requirements for the hydraulic braking system are minimized. This system has been illustrated for use with either spring-apply, pressure-release or pressure-apply, spring-release braking actuators. The pilot pressure operation of the brake control valve can be accomplished with either hydraulic or pneumatic pressure fluid. The brake control valve can be easily provided with a pneumatic emergency brake override control.

Other modifications of these embodiments will become obvious to those skilled in the art. For example, the pilot controlled brake control valve could be used to control other types of hydraulic actuators and are not limited to railway vehicle hydraulic braking systems.

We claim:

1. A hydraulic control system comprising:
   a hydraulic actuator,
   a source of pressurized hydraulic fluid,
   a hydraulic fluid reservoir,
   hydraulic circuitry connecting the actuator to the source and to the reservoir,
   a control valve located in the hydraulic circuitry for selectively varying actuator hydraulic pressure by controlling the flow of hydraulic fluid from the source to the actuator and from the actuator to the reservoir and being movable between a fluid supply position and a fluid return position,
   spring means biasing the control valve toward one of the positions,
   pilot pressure means biasing the control valve toward the other position and operable thereby to selectively vary actuator hydraulic pressure,
   actuator hydraulic pressure feedback means opposing the pilot pressure means, and
   pilot pressure control means for selectively varying the pilot pressure, including a first fluid passage connecting the pilot pressure means to a source of pressurized pilot fluid and a second fluid passage connecting the pilot pressure means to a pilot fluid reservoir,
   characterized by the pilot pressure control means including:
   a first pilot control valve in the first fluid passage,
   a second pilot control valve in the second fluid passage, and
   a hydraulic pressure selector responsive to selectively variable input signals to position the first and second pilot control valves to produce selectively variable pilot pressures that operate the control valve to produce the selected actuator hydraulic pressures.

2. A vehicle braking system comprising:
   hydraulic brake actuators for braking a vehicle at selectively variable brake rates,
   a source of pressurized hydraulic fluid,
   a hydraulic fluid reservoir,
   hydraulic circuitry connecting the brake actuators to the source and to the reservoir,
   a brake control valve located in the hydraulic circuitry for selectively varying brake pressure by controlling the flow of hydraulic fluid from the source to the brake actuators and from the brake actuators to the reservoir and being movable between a brake-apply position and a brake-release position,
   spring means biasing the brake control valve toward one of the positions,
   pilot pressure means responsive to pilot fluid pressure for biasing the brake control valve toward the other position and operable thereby to selectively vary brake pressure,
   brake pressure feedback means opposing the pilot pressure means, and
   pilot pressure control means for selectively varying the pilot fluid pressure, including a first fluid passage connecting the pilot pressure means to a source of pressurized pilot fluid and a second fluid passage connecting the pilot pressure means to a pilot fluid reservoir,
   characterized by the pilot pressure control means including:
   a first pilot control valve in the first fluid passage,
   a second pilot control valve in the second fluid passage, and
   a brake rate selector responsive to selectively variable brake rate input signals to position the first and second pilot control valves so as to produce selectively variable pilot pressures that operate the brake control valve to produce selectively variable brake pressures corresponding to the selected brake rates.

3. The vehicle braking system of claim 2, further characterized by override means for biasing the brake control valve toward brake-apply position, the override means being independent of the pilot pressure control means.

4. The vehicle braking system of claim 3, further characterized by the spring means biasing the brake control valve toward brake-release position, the pilot pressure means biasing the brake control valve toward brake-apply position, the override means including an actuator for biasing the brake control valve toward the brake-apply position, disabling means energizable to disable the actuator, and means for selectively energizing and de-energizing the disabling means.

5. The vehicle braking system of claim 4, further characterized by the actuator including means responsive to varying vehicle loads to vary the braking force of the actuator in accordance with vehicle load when the disabling means is de-energized.

6. The vehicle braking system of claim 2, further characterized by the pilot pressure fluid being air and the pilot fluid reservoir being the atmosphere.

7. The vehicle braking system of claim 2, further characterized by the pilot pressure fluid being hydraulic fluid, the pilot pressure fluid source being said source of pressurized hydraulic fluid, and the pilot fluid reservoir being the hydraulic fluid reservoir.

8. The vehicle braking system of claim 7, further characterized by the hydraulic brake actuators being spring-apply, hydraulic pressure-release actuators.

9. A railway vehicle braking system comprising:
   a plurality of hydraulic brake actuators for braking a railway vehicle at selectively variable brake rates,
   a source of pressurized hydraulic fluid,
   a hydraulic fluid reservoir,
   hydraulic circuitry connecting the brake actuators to the source and to the reservoir,
   a brake control valve located in the hydraulic circuitry for selectively varying brake pressure by controlling the flow of hydraulic fluid from the source to the brake actuators and from the brake actuators to the reservoir and being movable between a brake-apply position and a brake-release position,
   spring means biasing the brake control valve toward the brake-apply position, hydraulic pilot pressure means responsive to pilot fluid pressure for biasing the brake control valve toward the brake-release position, brake pressure feedback means opposing the pilot pressure means, and pilot pressure control means for selectively varying the pilot fluid pressure, including a first fluid passage connecting the pilot pressure means to the source of pressurized hydraulic fluid and a second fluid passage connecting the pilot pressure means to the hydraulic reservoir, characterized by the pilot pressure control means including:

a first pilot control valve in the first fluid passage, a second pilot control valve in the second fluid passage, and a brake rate selector responsive to selectively variable brake rate input signals to position the first and second pilot control valves so as to produce selectively variable pilot pressures that operate the brake control valve to produce selectively variable brake pressures corresponding to the selected brake rates.

* * * * *